United States Patent
Hopkins et al.

(10) Patent No.: US 9,942,353 B2
(45) Date of Patent: Apr. 10, 2018

(54) MANAGEMENT OF CONNECTIONS WITHIN A MESSAGING ENVIRONMENT BASED ON THE STATISTICAL ANALYSIS OF SERVER RESPONSIVENESS

(71) Applicant: International Business Machines Corporation, Armonk, NY (US)

(72) Inventors: Graham D. Hopkins, Chandlers Ford (GB); Timothy J. Quigly, Basingstoke (GB); Luke D. C. Saker, Eastleigh (GB); Craig H. Stirling, Winchester (GB); Matthew B. White, Bishop's Waltham (GB)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 14/728,057

(22) Filed: Jun. 2, 2015

(65) Prior Publication Data
US 2016/0360006 A1 Dec. 8, 2016

(51) Int. Cl.
*G06F 15/16* (2006.01)
*H04L 29/08* (2006.01)

(52) U.S. Cl.
CPC ............ *H04L 67/327* (2013.01); *H04L 67/34* (2013.01)

(58) Field of Classification Search
CPC . H04L 67/10; H04L 67/1095; H04L 41/5009; H04L 49/70; H04L 65/80; H04L 67/1029; H04L 47/125; H04L 65/1063; H04L 67/16; H04L 67/322; H04L 61/2076; H04L 47/10; H04L 67/1002;
(Continued)

(56) References Cited

U.S. PATENT DOCUMENTS 7,299,291 B1 * 11/2007 Shaw .................. H04L 65/4069
709/203
7,483,980 B2 1/2009 Thomas
(Continued)

OTHER PUBLICATIONS

Bhardwaj, et al., "Optimizing Server Response Time Through Routing Tables", 2012 International Conference on Computing Sciences, pp. 225-228, Date of Conference: Sep. 15, 2012, <http://ieeexplore.ieee.org/xpl/articleDetails.jsp?tp=&arnumber=6391679&queryText%3DSERVER+ROUTING+TABLE>.
(Continued)

*Primary Examiner* — Djenane Bayard
(74) *Attorney, Agent, or Firm* — Daniel R. Simek

(57) ABSTRACT

In one embodiment, a method for managing execution of software operations is provided. The method includes a computer processor determining that a software program executing on a computing device utilizes a server to execute at least one software operation. The method further includes identifying a first server from a plurality of servers that are capable of executing the at least one software operation of the software program based, at least in part, on a responsiveness associated with the first server and responsiveness associated with the plurality of servers. The method further includes executing the at least one software operation of the software program on the identified first server. The method further includes updating the responsiveness of the first server based, at least in part, on one or more responsiveness values attributed to the execution of the at least one software operation of the software program on the first server.

16 Claims, 6 Drawing Sheets

(58) Field of Classification Search
CPC ............ H04L 41/5019; H04L 41/5003; H04L 41/5012; H04L 45/38
See application file for complete search history.

(56) References Cited

U.S. PATENT DOCUMENTS

| | | |
|---|---|---|
| 8,234,330 B2 | 7/2012 | Hall |
| 8,910,185 B2 | 12/2014 | Dixon et al. |
| 2006/0236324 A1* | 10/2006 | Gissel .................. G06F 9/5083 718/105 |
| 2014/0040401 A1 | 2/2014 | Banks et al. |
| 2014/0280866 A1* | 9/2014 | Lyon .................. H04L 67/1019 709/224 |
| 2015/0006650 A1 | 1/2015 | Basavanna et al. |

OTHER PUBLICATIONS

Fei, et al., "A Novel Server Selection Technique for Improving the Response Time of a Replicated Service", Networking and Telecommunications Group, College of Computing, Georgia Institute of Technology, pp. 783-791, Date of Conference: Apr. 2, 1998, <http://ieeexplore.ieee.org/xpl/login.jsp?tp=arnumber=665101&url=http%A%2F%2Fieeexplore.ieee.org%2Fxpls%2Fabs_all.jsp%3Farnumber%3D665101>.

* cited by examiner

MANAGEMENT OF CONNECTIONS WITHIN A MESSAGING ENVIRONMENT BASED ON THE STATISTICAL ANALYSIS OF SERVER RESPONSIVENESS

BACKGROUND OF THE INVENTION

The present invention relates generally to the field of messaging environments, and more particularly to controlling server selection.

With the advent of distributed computing, software applications are less constrained by the resources of the computing device of a user (e.g., a laptop computer, a tablet computer, a netbook computer, a personal computer, a personal digital assistant, a smart phone, or wearable devices (e.g., smart glasses, smart watch, etc.)). A software application executes a portion of its operations on the computing device of a user (e.g., a client device, client) and utilizes external resources (e.g., processing power, communications, databases, information, etc.) via networking. One architecture that enables client devices to access/share data, information, or hardware and software resources is the client-server architecture. One definition for a server is an executing instance (e.g., a specific realization of: a physical entity, a virtualized entity, an executing software, an illustrative construct) of a software application that is capable of accepting requests (e.g., to perform tasks) from a client device and responding (e.g., provide results) to a request from the client device. In some instances, the client and server can execute on the same computer (e.g., as virtual machines). A server can execute within a self-contained computer, a hardware entity within a larger system (e.g., blade server), or a virtualized construct (e.g., a virtual machine (VM)) dynamically created from a pool of physical and virtualized resources (e.g., processors, memory, direct-access storage devices (DASD), network switches, etc.). Another definition for a server is a computing device that executes the server software. In other instances, the hardware included in a server is predicated on the types of applications supported. Common server types include: database servers, file servers, mail servers, print servers, web servers, gaming servers, and application servers.

Another aspect of distributed computing is redundancy. Redundant servers (e.g., replicas) are utilized to balance workload, duplicate functionality, and safeguard information (e.g., database replication). Duplicated servers can have the same hostname, within a level of a domain tree, but are accessed via different network connections (e.g., addresses). The Internet Protocol (IP) address for a server is associated with the hostname of a server and resolved by a domain name system (DNS). Replica servers are not constrained to include identical hardware (e.g., processors, memory, DASD, etc.). Communications between the servers and the client device can occur via a messaging environment and channels (e.g., connections).

A messaging environment (e.g., distributed message passing) is a communications architecture that provides software developers the capability to provide common services between applications utilizing different operating systems and different programming languages and executing on disparate computing systems in different location. Message queuing permits asynchronous client-server communications and enables computing devices to engage in multiple interactions. Additional capabilities can be included in a messaging environment by utilizing middleware. Middleware is the infrastructure that facilitates the creation of business applications and provides core services like concurrency, transactions, threading, messaging, and the service component architecture framework for service-oriented architecture (SOA) applications. Middleware also provides security and enables high availability functionality to an enterprise. Message-oriented middleware (MOM) is software or hardware infrastructure supporting sending and receiving messages between distributed systems. MOM allows application modules to be distributed over heterogeneous platforms and reduces the complexity of developing applications that span multiple operating systems and network protocols. The middleware creates a distributed communications layer that insulates the application developer from the details of the various operating systems and network interfaces. APIs that extend across diverse platforms and networks are typically provided by MOM.

SUMMARY

According to an aspect of the present invention, there is a method, computer program product, and/or system for managing execution of software operations. The method includes one or more computer processors determining that a software program executing on a computing device utilizes a server to execute at least one software operation. The method further includes one or more computer processors identifying a first server from a plurality of servers that are capable of executing the at least one software operation of the software program, based, at least in part, on a responsiveness associated with the first server and responsiveness associated with the plurality of servers. The method further includes one or more computer processors executing the at least one software operation of the software program on the identified first server. The method further includes one or more computer processors updating the responsiveness of the first server based, at least in part, on one or more responsiveness values attributed to the execution of the at least one software operation of the software program on the first server.

DETAILED DESCRIPTION

Figure 1:
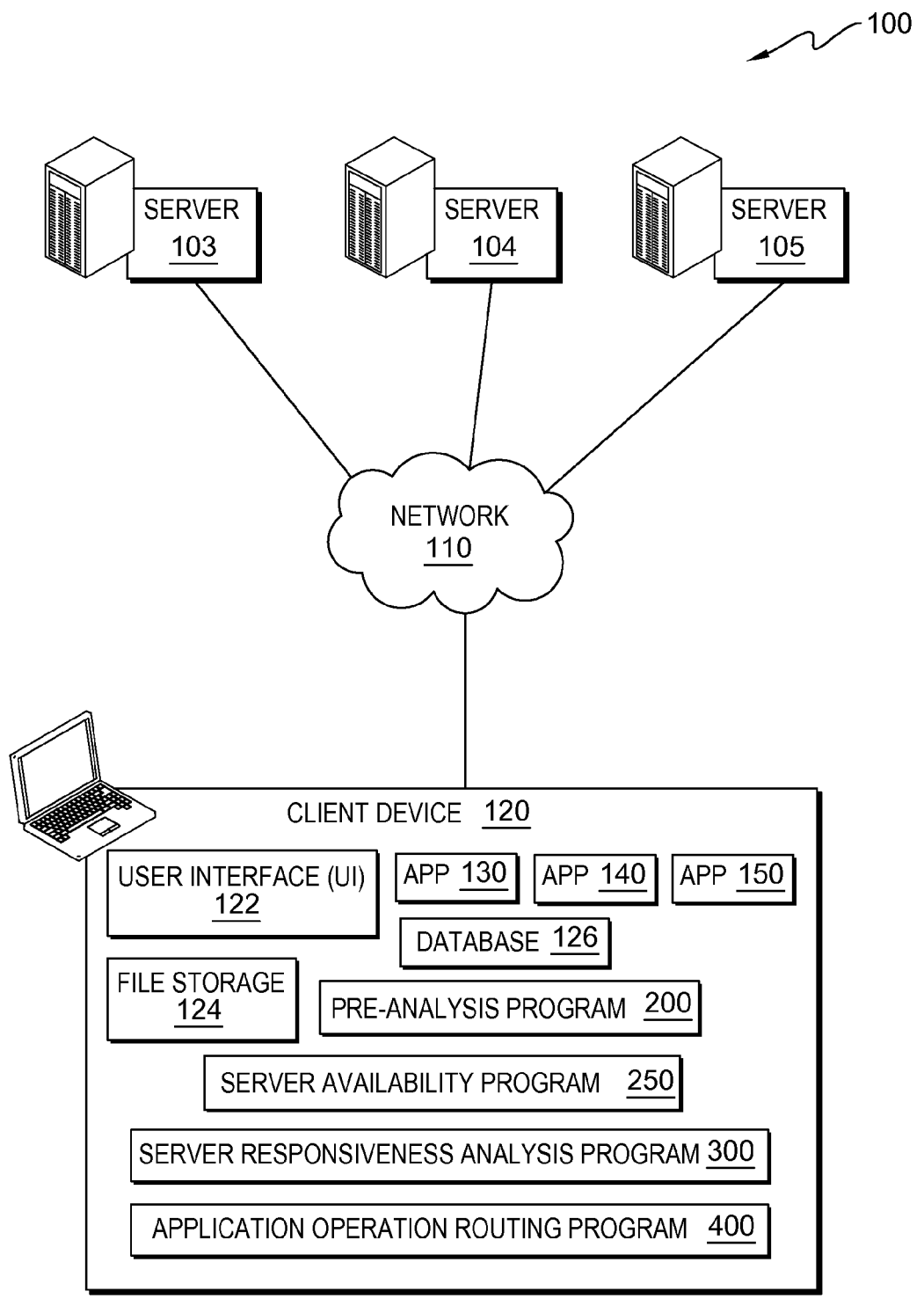
FIG. 1 illustrates a distributed data processing environment, in accordance with an embodiment of the present invention.

Embodiments of the present invention recognize that various software applications (apps) and software programs utilized by enterprise, business, medical, governmental, and other groups and organizations may execute within distributed computing systems, such as grid computers, computing clusters, and cloud-computing systems. Application execution may include combinations of code and application programming interfaces (API) which execute on a client device and other code and APIs that utilize one or more other computing devices (e.g., servers). The software code and APIs that access and utilize resources that exist within other computing devices are accessible via network connections (e.g., a client-server architecture). Communications between the client and the server are processed by a messaging system. However, the client device can select (e.g., identify) the server that includes the resources or information that the client requires. The server identification information (e.g., hostname) is generally static (e.g., domain specific) and can be associated with a software application. The software application can be created in an integrated development environment (IDE) that includes a connection factory, which identifies the servers that are utilized by the software application. In some embodiments, the server identification information is included in a messaging server routing table. In other embodiments, the server identification information is included in a channel definition table (e.g., a client channel definition table). In a different embodiment, the messaging server routing table is a construct of the present invention associated with a software application as opposed to functionality within the messaging environment.

Embodiments of the present invention recognize that in some distributed computing systems, replica servers (e.g., duplicate servers) exist to share the workload and access copies of information and data (e.g., databases). The workload in a distributed computing environment, utilizing replica servers, can be balanced (e.g., rerouted) on the server side by a load-balancing system resulting in workload optimization while possibly degrading the behavior (execution) of specific software applications. Embodiments of the present invention provide the client device the ability to utilize capabilities of: the messaging environment, the APIs, and the middleware to specify (e.g., route) the execution of server-side operations of a software application to specific servers. In some embodiments, an application directs server-side operation by utilizing IP addresses of servers. Examples of messaging APIs include, put-message, get-message, browse-message, commit, and rollback.

Embodiments of the present invention further provide a client device the capability to quantify the responsiveness of various servers executing the server-side operations. Statistical analysis of server responsiveness provides a client device an "intelligent" method to select which server instance executes the server-side operations. Embodiments of the present invention also recognize that not all server-side operations are equally important to the execution of a software application. The responsiveness to some server-side operations may be monitored. Other server-side operations may be weighted differently in a statistical analysis. Embodiments of the present invention also provide the client device the capability of dynamically modifying the server instance selection and operation routing. The triggers for modifying server instance selection include threshold values that are applied to the historical, statistical server responsiveness data and compared to the currently monitored responsiveness data to reduce unnecessary modifications to the server instance selection. For example, within a given 2-minute monitoring period, the threshold value for the average response time may be exceeded, initiating a modification in server instance selection. However, within a given 15-minute monitoring period, the average response time threshold value may not exceeded. Server responsiveness can be monitored to various degrees of granularity. For example, server responsiveness can be monitored: at the application level, at the API level, or at a business logic level.

Embodiments of the present invention also recognize that server responsiveness may vary with time or other factors. Modeling server responsiveness over longer periods can identify trends which may affect server instance selections. For example, long-term modeling may identify peak-usage periods (e.g., during on-line holiday shopping) and server maintenance periods. Modeling server responsiveness as a function of server metrics may identify server configurations (e.g., physical computing resources, virtualized computing resources, etc.) that provide improved responsiveness, improved transactional integrity, and/or are more cost-effective to utilization.

Some embodiments of the present invention provide for the pre-analysis of software applications and servers to generate metrics that are utilized to generate the initial server instance selections. Further embodiments of the present invention can respond to detecting that a new instance of a server (e.g., server replica) is on-line as opposed to just reacting to the loss of a server. Application metrics and server metrics can be compared to statistical responsiveness values. For example, if a utilized type (e.g., hostname) of server is a VM and a new VM is provisioned with different resources, analysis of the metrics for the new VM may initiate a modification in server name selection without requiring the client device to obtain server responsiveness data.

Additional embodiments of the present invention recognize that it may be advantageous to upload information obtained by client device 120 during the utilization of the present invention. In one embodiment, uploading information, especially raw server responsiveness data, and storing the information on another device (e.g., a network-attached storage device) frees persistent storage space on client device 120. In another embodiment, uploading information obtained during the utilization of the present invention to another location accessible via network 110 permits other users that utilize app 130, app 140, and app 150 to obtain the benefits of intelligent (e.g., statistically based) server (e.g., server instance) selection by reducing or eliminating the time require to independently obtain statistically significant responsiveness data used in server instance selection. In yet another embodiment, permitting software developers and/or server owners access to application metrics, server metrics, and responsiveness data may improve: a software application, the quality of service for a software application, detecting server trends (e.g., utilization, peak periods, precursors to server failure, etc.), and server resource definition (e.g., allocations, provisioning, etc.).

A different embodiment of the present invention may be optimized and implemented to improve the responsiveness of a database.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating distributed data processing environment 100, in accordance with the present invention. An embodiment of distributed data processing environment 100 includes server 103, server 104, server 105, and client device 120, all interconnected over network 110. Many modifications to the depicted environment may be made by those skilled in the art without departing from the scope of the invention as recited by the claims.

Server 103, server 104, server 105, and client device 120 may be laptop computers, tablet computers, netbook computers, personal computers (PC), desktop computers, personal digital assistants (PDA), smart phones, wearable devices (e.g., digital eyeglasses, smart glasses, a smart watch), or any programmable computer systems known in the art. In certain embodiments, server 103, server 104, server 105, and client device 120 represent computer systems utilizing clustered computers and components (e.g., database server computers, application server computers, file server computer, network-attached storage devices, etc.) that act as a single pool of seamless resources when accessed through network 110, as is common in data centers and with cloud-computing applications. In general, server 103, server 104, and server 105 are representative of any programmable electronic device or combination of programmable electronic devices capable of executing machine readable program instructions and communicating with client computers, such as client device 120, via network 110. Server 103, server 104, server 105, and client device 120 may include components, as depicted and described in further detail with respect to FIG. 5, in accordance with embodiments of the present invention. Server 103, server 104, and server 105 include resources (not shown) that are utilized by client device 120.

In one embodiment, client device 120, server 103, server 104, and server 105 communicate through network 110. Network 110 can be, for example, a local area network (LAN), a telecommunications network, a wireless local area network (WLAN), a wide area network (WAN), such as the Internet, or any combination of the previous, and can include wired, wireless, or fiber optic connections. In general, network 110 can be any combination of connections and protocols that will support communications between client device 120 and server 103, in accordance with embodiments of the present invention. In another embodiment, network 110 operates locally via wired, wireless, or optical connections and can be any combination of connections and protocols (e.g., near field communication (NFC), laser, infrared, etc.).

In some embodiments, network 110 includes one or more servers (not shown) that act as messaging servers and or queue managers that control the routing of server-side operations of applications (e.g., app 130, app 140, and app 150) executing on client device 120. Network 110 may utilize one or more protocols to route server-side operations to server 103, server 104, and/or server 105. In some scenarios, message queuing is utilized to route server-side operations to server 103, server 104, and/or server 105 from client device 120 and return one or more results of the server-side operations to the respective applications executing on client device 120. For example, an open standard protocol for message-oriented middleware is advanced message queuing protocol (AMQP). In other embodiments, network 110 includes message-oriented middleware implemented via a hardware infrastructure or software infrastructure that supports sending and receiving messages between distributed systems and client device 120.

Client device 120 includes user interface (UI) 122, file storage 124, database 126, app (application) 130, app 140, app 150, pre-analysis program 200, server availability program 250, server responsiveness analysis program 300, application operation routing program 400, and various programs (not shown). Examples of programs (not shown) that client device 120 includes are: one or more statistical analysis programs, an e-mail client, a word processor, a web browser, networking programs, and various middleware programs (not shown) that support app 130, app 140, and app 150. A user of client device 120 can interact with UI 122 via a singular device, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser) can generate UI 122, operating within the GUI of client device 120. UI 122 accepts input from a plurality of input/output (I/O) devices (not shown) including, but not limited to, a tactile sensor interface (e.g., a touch screen, a touchpad) or a natural user interface (e.g., voice control unit, motion capture device, etc.). An I/O device interfacing with UI 122 may be connected to client device 120 which may operate utilizing wired (e.g., USB port) or wireless network communications (e.g., infrared, NFC, etc.). For example, an I/O device may be a peripheral, such as a keyboard, a mouse, a trackball, and a click wheel that provide input from a user.

In some embodiments, an user of client device 120 utilizes UI 122 to input/customize application preferences, threshold values, server models, and the mathematical formulas for the statistical analysis of server responsiveness.

In some embodiments, file storage 124 contains databases, log files, lists, images, etc., that support app 130, app 140, and app 150. File storage 124 also includes the statistical models associated with app 130, app 140, and app 150. File storage 124 may also include statistical models for server 103, server 104, and server 105. File storage 124 may include models describing networking, queuing delays attributed to network 110, and delays associated with the messaging infrastructure. In addition, file storage 124 includes various application preferences utilized by embodiments of the present invention. Application preferences include: threshold values, server selection criteria, and parameters utilized for statistics/modeling (e.g., moving average duration, sampling plans, etc.).

In some embodiments, database 126 is a central repository of information for application information (e.g., business logic, application metrics, API metrics, utilized resources, etc.), messaging server routing tables, channel definition tables, application version controls, server capabilities, server metrics, and statistical information (e.g., data) on the responsiveness of servers. In other embodiments, database 126 is dedicated to server responsiveness information (e.g., raw responsiveness data, statistical analysis data, responsiveness models, etc.) and messaging server routing tables.

Pre-analysis program 200 analyzes new/updated applications on client device 120 to determine which transactions, operations, and remote procedure calls of a software application execute on a server (e.g., server-side operations). Additionally, pre-analysis program 200 determines the business logic and transaction integrity (e.g., tolerance of errors, tolerance of failing to obtain results) constrains of a software application that are subsequently utilized to identify which server-side operations may be routed to a server identified in a messaging server routing table. In one embodiment, pre-analysis program 200 determines the relative computing resources utilized by a software application to determine a metric for the software application. In another embodiment, pre-analysis program 200 determines the relative computing resources utilized by a sequence of server-side operations (e.g., APIs, modules, linked applications, etc.) and defines a metric for each sequence of server-side operations as a basis of selecting one or more servers to execute the server-side operations. Pre-analysis program 200 also determines metrics associated with the servers utilized by a software application. Pre-analysis program 200 prioritizes the initial server selection and creates/updates a messaging server routing table, associated with a software application, with the prioritized server instance selections.

Server availability program 250 verifies the status/state (e.g., executing, paused, etc.) of the servers utilized by a software application. In addition, server availability program 250 detects when additional instances (e.g., replicas) of servers utilized by a software application are activated. Server availability program 250 can update a messaging server routing table to remove instances of servers that are not available and may include the additional server instances. In some embodiments, server availability program 250 executes concurrently with server responsiveness analysis program 300 and application operation routing program 400 updates to identify losses or additions of servers (e.g., server instances) in real time. In other embodiments, server availability program 250 executes on a periodic basis. For example, server availability program 250 executes when a software application, utilizing embodiments of the present invention, executes.

Server responsiveness analysis program 300 determines the responsiveness of servers to the server-side operations (e.g., transactions, operations, remote procedure calls, etc.) of a software application identified by pre-analysis program 200. Server responsiveness analysis program 300 monitors server responsiveness and obtains data for responsiveness parameters. Server responsiveness parameters include: total response time, server-side operation execution time, rollback rates, transaction failure rates, networking delays, and transmission failures. Server responsiveness analysis program 300 utilizes a messaging server routing table to determine which servers are utilized by an application. Subsequently, server responsiveness analysis program 300 performs statistical analysis on the server responsiveness data. In some embodiments, server responsiveness analysis program 300 generates a statistical model for a server based, at least in part, on the calculation of statistics such as: mean, standard deviation, moving average, etc. Server responsiveness analysis program 300 may update the messaging server routing table based on the statistical analysis of server responsiveness. When sufficient server responsiveness data is obtained and statistically analyzed, server responsiveness analysis program 300 transfers control of server instance selection (e.g., rerouting of server-side operations) to application operation routing program 400 which responds to variations in server responsiveness.

Application operation routing program 400 monitors the responsiveness of server-side operation when server responsiveness analysis program 300 determines that statistical analysis data is available for a server. Application operation routing program 400 compares the monitored responsiveness of a server for a server-side operation to a statistical model for a server and determines if a reaction threshold has been met. In addition, application operation routing program 400 updates a server responsiveness database with the responsiveness data. If a reaction threshold is met, application operation routing program 400 selects another server to execute server-side operations. Application operation routing program 400 may update the statistical analysis associated with the servers utilized during the execution of a software application on client device 120.

Figure 2A:
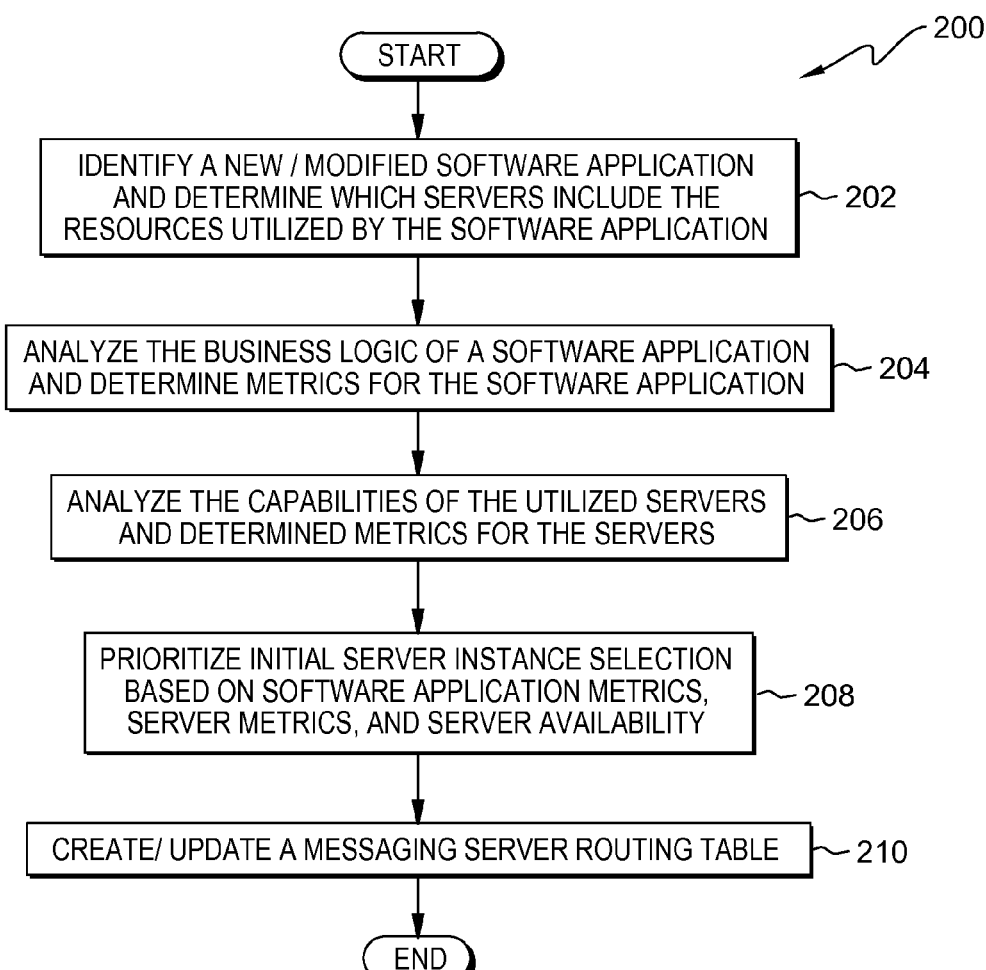
FIG. 2a depicts a flowchart of the operational steps of a pre-analysis program, in accordance with an embodiment of the present invention.

FIG. 2a is a flowchart depicting operational steps for pre-analysis program 200, a program for analyzing applications that execute on client device 120 and that execute operations on servers, in accordance with embodiments of the present invention. In addition, pre-analysis program 200 determines metrics for the software application and utilized servers to create a messaging server routing table to route operations to servers. Pre-analysis program 200 stores the results of various determination and analysis in file storage 124 on client device 120.

In step 202, pre-analysis program 200 identifies a new/modified software application and determines which servers include the resources utilized by the software application. In some embodiments, pre-analysis program 200 identifies that a software application is a new application. In one scenario, pre-analysis program 200 determines that app 130 is a new application by utilizing a cross-reference, a list, or a database within file storage 124 to identify that no references exist (e.g., no messaging server routing table for app 130). In another scenario, pre-analysis program 200 identifies that a software application (e.g., app 130) is new based on a lack of metrics associated with the software application. In some scenarios, pre-analysis program 200 may utilize database 126 as a central repository for which applications are defined (e.g., have a messaging server routing table) and the server names (e.g., hostnames) utilized by each software application.

In other embodiments, pre-analysis program 200 identifies that a software application is a modified version of a software application (e.g., an updated version). In one scenario, pre-analysis program 200 identifies that a current instance of app 140, on client device 120, is a modified version of the previously analyzed version of app 140 by referencing version control information (e.g., a file within file storage 124). In another scenario, pre-analysis program 200 identifies that a current instance of app 140, on client device 120, is a modified version of app 140 by differences in file attribute information. For example, pre-analysis program 200 identifies that the file size and time stamp for app 140 is different from file information stored in a log file, a list stored, or a database stored on client device 120.

In step 204, pre-analysis program 200 analyzes the business logic of a software application and determines metrics for the software application. Metrics may be defined relative to resource utilization (e.g., networking intensive, computationally intensive, database/transactionally intensive). In one embodiment, pre-analysis program 200 determines that the business logic and transactional integrity requirements of a software application dictate that the software application is analyzed as a single entity. In another embodiment, pre-analysis program 200 determines that the business logic and transactional integrity requirements indicate that the software application may be analyzed in segments. For example, pre-analysis program 200 may determine the business logic for a software application by analyzing API calls to specific resources. In one scenario, pre-analysis program 200 analyzes the segments (e.g., modules) of the software application and aggregates the metrics of the segments into a metric to facilitate the selection of one server. In another scenario, pre-analysis program 200 determines that the software application may be executed based on segmentation by API calls. Pre-analysis program 200 analyzes the metrics for the API calls and prioritizes the server instance selection distribution based on the metrics of the API calls. For example, one metric may be developed based on transaction "gets" and another metric may be based on non-transaction "puts."

In step 206, pre-analysis program 200 analyzes the capabilities of the utilized servers and defines metrics for the servers. The utilized servers may be identified by server names, host names, or resolved from IP addresses. Metrics may be defined relative to hardware resource (e.g., fast DASD, multiple processing cores, processing core speed, available RAM, etc.) associated with a server (e.g., server name, specific server instance).

In step 208, pre-analysis program 200 prioritizes the initial server instance selection based on software application metrics and the server metrics. Pre-analysis program 200 utilizes the metrics for a software application and the metrics associated with the servers utilized by the software application to determine an initial selection of servers to execute the server-side operations of an application. In one embodiment, pre-analysis program 200 indicates the priority of a server instance by a flag (e.g., a numerical value, a hierarchical indicator). In another embodiment, pre-analysis program 200 indicates the priority of a server instance (e.g., server 104) by location (e.g., position) of the server instance in a list or table.

In some embodiments, pre-analysis program 200 applies a secondary condition to prioritization of server instance selection. In one scenario, pre-analysis program 200 applies a distribution criteria to the initial server instance selection. For example, pre-analysis program 200 may determine that server 103 and server 104 have similar metrics, and server 105 has less favorable metrics (e.g., fewer computing resources, resources optimized for different server-side operations, etc.) for execution of server-side operations for app 150. In one instance, pre-analysis program 200 may assign a distribution for the execution of server-side operations. For example, pre-analysis program 200 selects server 103 and server 104 for 40% of the server-side operations of app 150, and server 105 is selected for 20% of the server-side operations of app 150. In another instance, pre-analysis program 200 may assign a probability of selection (based on the distribution) for the execution of server-side operations. For example, pre-analysis program 200 may assign a server instance selection probability of 45% to server 103 and server 104, and a server instance selection probability of 10% for server 105.

In step 210, pre-analysis program 200 creates/updates a messaging server routing table. Pre-analysis program 200 utilizes the server instance selection prioritization (step 208) to create/update a messaging server routing table. In an embodiment, a messaging server routing table is a semi-static entity that includes a list of servers and server instances utilized by a software application. In one scenario, pre-analysis program 200 creates a messaging server routing table that contains an indication as to which servers (e.g., server names, hostnames, IP addresses, etc.) are utilized by a software program and the server instance election prioritization. In another scenario, pre-analysis program 200 creates a messaging server routing table that identifies the servers (e.g., hostnames) but utilizes a DNS to resolve the IP addresses that are associated with the hostnames. In other embodiments, pre-analysis program 200 utilizes a connection factory utility within an IDE to create a messaging server routing table for a software application. Subsequently, pre-analysis program 200 updates the messaging server routing table based on the server instance selection prioritization (step 208).

Figure 2B:
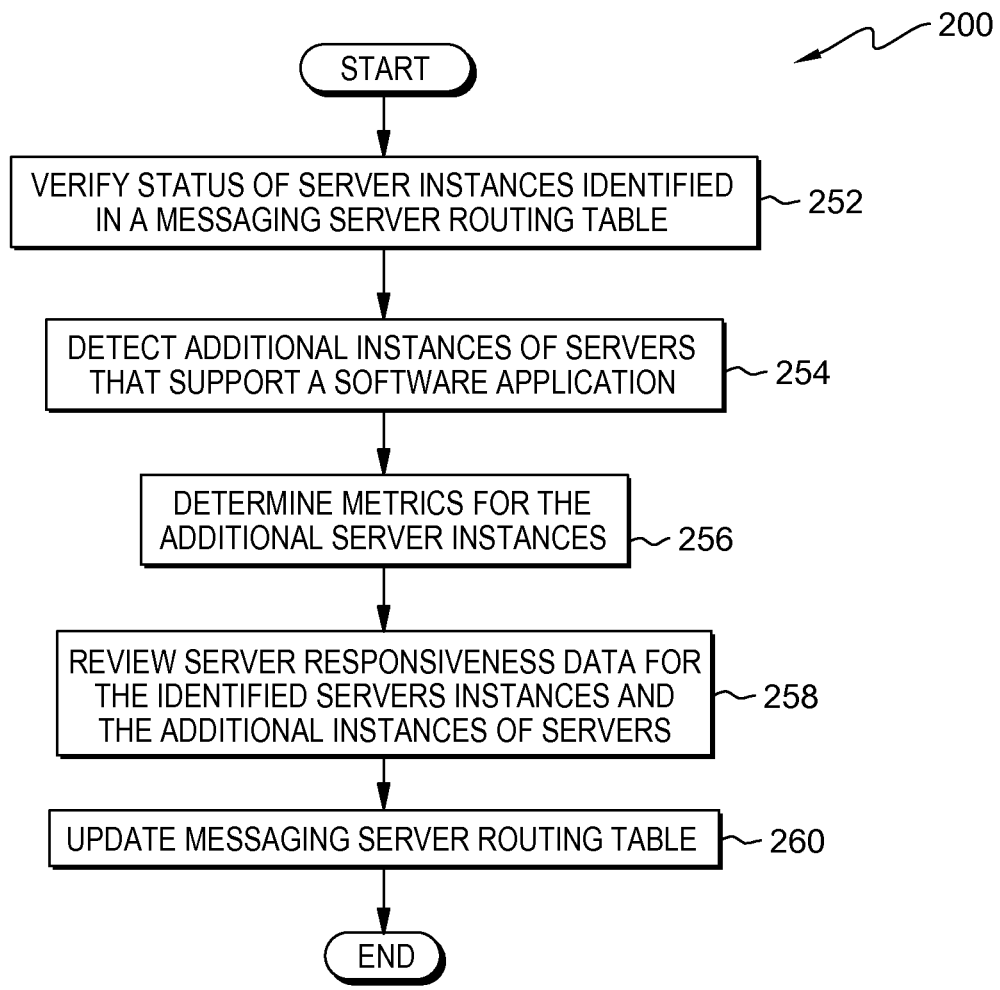
FIG. 2b depicts a flowchart of the operational steps of a server availability program, in accordance with an embodiment of the present invention.

FIG. 2b is a flowchart depicting operational steps for server availability program 250, a program for determining whether servers utilized by a software application are available and when additional instances (e.g., replicas) of servers utilized by a software application are active, in accordance with embodiments of the present invention. In addition, server availability program 250 determines metrics for the instances of additional servers utilized by a software application and updates a messaging server routing table to include the additional server instances.

In step 252, server availability program 250 verifies the status of the server instances identified in a messaging routing table. Server availability program 250 verifies that server instances identified in a messaging routing table for a software application are on-line and active. In some embodiments, server availability program 250 may locate the server instances identified in a messaging server routing table utilizing various networking and communication techniques (e.g., server name, hostname, IP address, DNS, etc.). Subsequently, server availability program 250 determines the status/state (e.g., paused, suspended, active, stopped, etc.) of the located servers and server instances.

In step 254, server availability program 250 detects additional instances of servers that support a software application. In one embodiment, server availability program 250 detects the additional instances of servers that support a software application by comparing the number of each named server listed in a messaging server routing table and the DNS information for the named servers. For example, a messaging server routing table for app 130 lists a server with the name "inventory-DB" at IP address 192.13.26.1 (e.g., server 103). However, server availability program 250 determines that the DNS information for server name "inventory-DB" lists IP addresses of 192.13.26.1 (e.g., server 103) and 192.13.26.7 (e.g., server 105), an additional instance. In another embodiment, the servers utilized by a software application exist as virtual machines (VMs) in a virtualized computing system or cloud environment. For example, server availability program 250 receives a communication from a virtual machine manager (VMM) (not shown) via network 110 as to: the server names which are provisioned, the number of VMs of each server name, and the state (e.g., status) of each of the provisioned VMs.

In step 256, server availability program 250 determines metrics for the additional server instances. Server availability program 250 determines metrics for the additional server instances detected in step 254. Metrics may be defined relative to hardware resource (e.g., fast DASD, multiple processing cores, processing core speed, available RAM, etc.) associated with a server.

In step 258, server availability program 250 reviews the server responsiveness data for the identified server instances and the additional instances of servers. In an embodiment, server availability program 250 reviews the statistical analysis of the server responsiveness parameters for the identified server and additional instance of utilized server. In some embodiments, server availability program 250 accesses application preference information to determine which server responsiveness parameters are important to a software application.

In step 260, server availability program 250 updates a messaging server routing table. In one embodiment, server availability program 250 updates a messaging server routing table to flag or remove servers that are not active, do not exist, or are paused. In another embodiment, a messaging server routing table adds the additional instances of servers utilized by a software application to the messaging server routing table. In some embodiments, server availability program 250 updates the server instance selection or server instance prioritization within a messaging server routing table based, at least in part, on the status of a server, the metrics of a server, and one or more statistical analysis values for the responsiveness of utilized servers.

Figure 3:
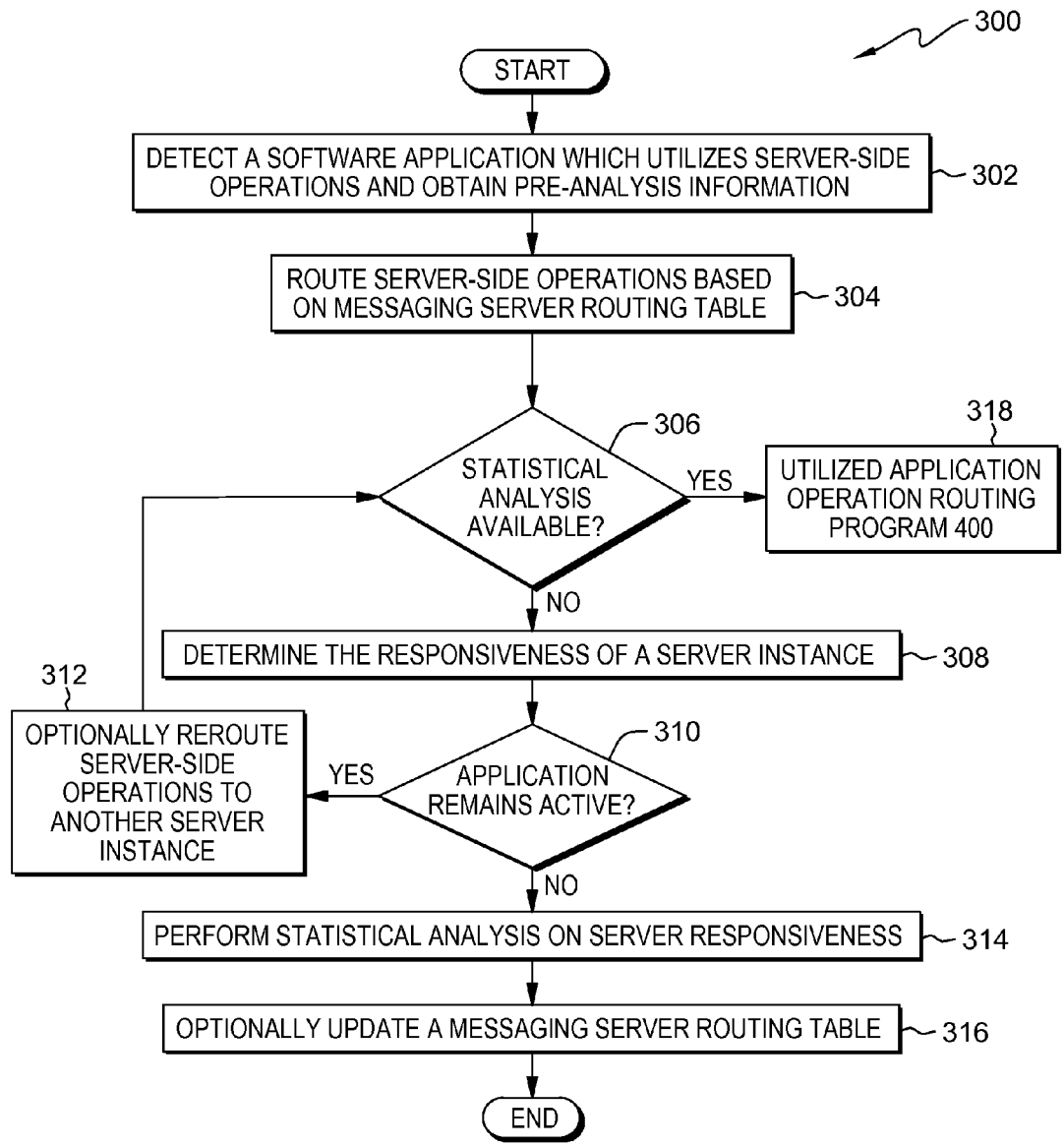
FIG. 3 depicts a flowchart of the operational steps of a server responsiveness analysis program, in accordance with an embodiment of the present invention.

FIG. 3 is a flowchart depicting operational steps for server responsiveness analysis program 300, a program for routing the server-side operations of a software application to servers, obtaining responsiveness data for the servers, and statistically analyzing the responsiveness data for a server, in accordance with embodiments of the present invention.

In step 302, server responsiveness analysis program 300 detects a software application which utilizes server-side operations and obtains pre-analysis information for the software application. In some embodiments, server responsiveness analysis program 300 detects that a software application utilizes server-sided operations by: identifying the name of the software application in database 126, detecting an API call to a messaging system, a list or cross-reference within file storage 124 (e.g., an application associated with a messaging server routing table), etc. In addition, server responsiveness analysis program 300 obtains the pre-analysis information and associated metrics for a software application and the servers utilized by the software application (e.g., information determined by pre-analysis program 200).

In step 304, server responsiveness analysis program 300 routes the server-side operations of a software application based on a messaging server routing table. In one embodiment, server responsiveness analysis program 300 routes the server-side operations based on the prioritized initial server instance selection, for a hostname, derived by pre-analysis program 200. In an example embodiment, server responsiveness analysis program 300 utilizes a messaging server routing table, which is included in the obtained pre-analysis information (obtained in step 302). In another embodiment, server responsiveness analysis program 300 distributes server-side operations based on the secondary criteria applied to server instance selection within a messaging server routing table. In some embodiments, server responsiveness analysis program 300 may poll active servers when instances of a server have similar metrics or responsiveness to obtain a workload "snapshot" that may bias the selection of which server instance is initially utilized for server-side operations. In a different embodiment, server responsiveness analysis program 300 selects a server based on a probability distribution associated with a server name within a messaging server routing table.

In decision step 306, server responsiveness analysis program 300 determines whether statistical analysis information is available for a server instance. The statistical analysis information includes one or more responsiveness values describing one or more responsiveness parameters of a server instance. Responsiveness values may include: a mean, a standard deviation, a moving average, a cumulative average, a high value, a low value, a range, and a moving standard deviation. In one embodiment, server responsiveness analysis program 300 determines that statistical analysis information is available when one or more responsiveness values are associated with a server and/or a software application stored in database 126. In another embodiment, server responsiveness analysis program 300 determines that statistical analysis information available when one or more responsiveness values are associated with a server and/or a software application stored in a file or database within file storage 124. In some embodiments, server responsiveness analysis program 300 may not find statistical analysis information available for a server. In one scenario, a server is a new server or server instance without server responsiveness data (e.g., values, information, etc.). In another scenario, server responsiveness analysis program 300 does not find statistical analysis information available for a server instance because insufficient responsiveness data is available to generate statistically significant results for one or more statistically calculated values respectively associated one or more responsiveness parameters identified as important to the operation of a software application.

Referring to decision step 306, in response to server responsiveness analysis program 300 determining that statistical analysis information is available for a server instance (yes branch, decision step 306), server responsiveness analysis program 300 utilizes application operation routing program 400 (step 318).

In step 318, server responsiveness analysis program 300 utilizes application operation routing program 400. Server responsiveness analysis program 300 transfers the execution control for one or more server-side operations, the monitoring of the responsiveness of server instances to the execution of the one or more server-side operations, and the selection of an alternate server or server instance when one or more reaction thresholds are met to application operation routing program 400.

In response to server responsiveness analysis program 300 determining that statistical analysis information is not available for a server (no branch, decision step 306), server responsiveness analysis program 300 determines the responsiveness of a server (step 308).

In step 308, server responsiveness analysis program 300 determines the responsiveness of a server instance to a server-side operation. In one embodiment, server responsiveness analysis program 300 monitors various responsiveness parameters of a server instance (e.g., server) from the transmission of a server-side operation by client device 120 via a messaging infrastructure to client device 120 receiving one or more results from the server via the messaging infrastructure within network 110. Server responsiveness analysis program 300 obtains data for responsiveness parameters such as: total response time, server-side operation execution time, rollback rates, transaction failure rates, etc. In another embodiment, server responsiveness analysis program 300 includes networking delays and transmission failures associated with a messaging infrastructure with the various responsiveness parameters associated with a server instance.

In some embodiments, server responsiveness analysis program 300 receives results that are messages. In one scenario, server responsiveness analysis program 300 may receive a message as opposed to a result of a server-side operation. For example, server responsiveness analysis program 300 receives a message (e.g., exception handling, error message, etc.) due to a user of client device 120 inputting erroneous data to app 140. In another scenario, server responsiveness analysis program 300 may receive a message that is a result. For example, server responsiveness analysis program 300 receives a message indicating that an item, requested by a user utilizing app 140, is out of stock. In yet another scenario, server responsiveness analysis program 300 may receive a message as opposed to a result when a server-side operation (e.g., on server 103) fails or "times out" by exceeding a response time specified by a software application (e.g., app 130).

In decision step 310, server responsiveness analysis program 300 determines whether a software application remains active. In one embodiment, server responsiveness analysis program 300 determines that a software application remains active by communicating with the messaging environment to determine that a connection (e.g., socket connection, TCP/IP connection, UDP connection, etc.) remains active (e.g., connection end-points remain registered). In some scenarios, server responsiveness analysis program 300 may determine than a software application remains active via interfacing with a connection management system. For example, app 130 utilizes a software architecture that includes APIs and a connection management system that enables components of a software application on client device 120 to connect with applications servers.

In another embodiment, server responsiveness analysis program 300 determines that a software application remains active based on communication from a software application. In one scenario, server responsiveness analysis program 300 determines that a software application remains active via polling messages received from a software application and/ or between software applications. For example, app 150 is a software application linked to app 140. Server responsiveness analysis program 300 determines that app 140 remains active on server 104 at least until app 150 communicates results to app 140. In another scenario, server responsiveness analysis program 300 determines that a software application remains active by receiving communications from a transaction management function. For example, app 140 utilizes a software architecture that includes APIs and a transaction management function that enables a software application on client device 120 to manage transaction server-side operations.

In a different embodiment, server responsiveness analysis program 300 utilizes a different default condition to determine that a software application remains active. When server responsiveness analysis program 300 receives a server-side operation, server responsiveness analysis program 300 defaults to an "always-active" status for a software application. In one scenario, server responsiveness analysis program 300 may determine that a software application ceases to remain active when a completion status is received. In one instance, server responsiveness analysis program 300 receives a completion status as a result from a server-side operation. In another instance, server responsiveness analysis program 300 receives a completion status from the software application utilizing a server. In another scenario, server responsiveness analysis program 300 determines that a software application ceases to remain active when a software application issues a "time-out" communication.

Referring to decision step 310, in a further embodiment, multiple instances of server responsiveness analysis program 300 may monitor the server-side operations of a software application that utilizes a plurality of servers and server instances. In one scenario, server responsiveness analysis program 300 responds to a software application as being active if any server remains connected or executes a server-side operation. In another scenario, each instance of server responsiveness analysis program 300 responds to the connection and execution of the server-side operations independently with respect to a server that is monitored by an instance of server responsiveness analysis program 300 to determine whether a software application remains active. For example, app 140 utilizes server 103 for networking-based server-side operations and server 104 for database-based server-side operations. When app 140 completes database operations, app 140 communicates a completion status to server 104 via the messaging infrastructure and the instance of server responsiveness analysis program 300 monitoring server 104 responds as if app 140 is not active. However, the instance of server responsiveness analysis program 300 that monitors server 103 responds as if app 140 is active.

In response to a determination that a software application remains active (yes branch, decision step 310), server responsiveness analysis program 300 optionally reroutes server-side operations to another server (step 312). Subsequently, server responsiveness analysis program 300 loops to determine additional server responsiveness data.

In step 312, server responsiveness analysis program 300 optionally reroutes server-side operations to another server instance. Prior to looping to decision step 306 to obtain additional server responsiveness data, server responsiveness analysis program 300 may reroute server-side operations to another server instance. In one embodiment, server responsiveness analysis program 300 monitors the responsiveness of a specific server until statistically significant responsiveness data is obtained. In another embodiment, server responsiveness analysis program 300 reroutes server-side operation based on a software application preference. For example, a software application preference (e.g., app 150) may indicate to server responsiveness analysis program 300 reroutes server-side operations periodically (e.g., every ten server-side operations) between server 104 and server 105 to obtain responsiveness data for each server instance for the purpose of statistical analysis. In another example, server responsiveness analysis program 300 that to reroute server-side operations on a percentage basis (e.g., 50% to server 103, 30% to server 104, 20% to server 105). In another scenario, server responsiveness analysis program 300 determines that another instance of server 103 occurs in messaging server routing table (step 304). A software application preference may dictate that server responsiveness analysis program 300 reroutes server-side operation to the new instance of server 103 if the new instance of a server has different metrics. For example, the first and second instance of server 103 are VMs provisioned with 2.0 GHz processors. A third instance of server 103 is a VM that is provisioned on another system that utilizes 2.4 GHz processors, thereby creating an instance of server 103 with a different processor speed metric than the first or second instance of server 103.

In step 314, server responsiveness analysis program 300 performs statistical analysis on server responsiveness. More specifically, responsive to determining that a software application does not remain active (no branch, decision step 310), server responsiveness analysis program 300 performs statistical analysis on server responsiveness. Server responsiveness analysis program 300 analyzes responsiveness parameters that include: total response duration for receiving one or more results, networking delay durations, rates of rollbacks for server-side operations, and quality of service (e.g., rate of failure for obtaining results). Additional responsiveness parameters may include messaging system queuing delays and server availability. Server responsiveness analysis program 300 may utilize various programs on client device 120 to perform the statistical analysis on server responsiveness parameters. Statistical values calculated for some server responsiveness parameters include: a mean, a standard deviation, a moving average, a cumulative average, a high value, a low value, a range, and a moving standard deviation.

In one embodiment, server responsiveness analysis program 300 performs statistical analysis on responsiveness data for a server instance. In another embodiment, server responsiveness analysis program 300 may perform statistical analysis on responsiveness data from multiple servers or server instances. In one scenario, server responsiveness analysis program 300 performs statistical analysis on multiple instances of a server (e.g., server 105). In another scenario, server responsiveness analysis program 300 performs statistical analysis for each server utilized for server-side operations by a software application. For example, server 103, server 104, and server 105 are utilized during the execution of app 140. In some embodiments, server responsiveness analysis program 300 generates a statistical model for a server based, at least in part, on the calculation of statistics such as: mean, standard deviation, time-based moving average, transaction-based moving average, etc.

Referring to step 314, in a further embodiment, server responsiveness analysis program 300 utilizes various statistical methods (e.g., ANOVA, linear regressions, multivariate regression, etc.) to determine the relationships between application metrics, server metrics, and time-based server responsiveness data. Server responsiveness analysis program 300 may develop models to improve the granularity of the statistics utilized to select a server instance and predict time or metric based trends that affect server instance responsiveness and selection. In one scenario, a model generated by server responsiveness analysis program 300 may identify peak-usage times when some servers may exhibit degraded responsiveness because of a higher than average usage by other applications. For example, a model generated by server responsiveness analysis program 300 may identify that one of the database servers utilized by a software application is affected during specific times when another application is processing payroll data. In another scenario, server responsiveness analysis program 300 may include simulations as an aspect of modeling server responsiveness. In one example, a Monte Carlo-type simulation may be used to model the best selection of a subset of servers utilized to execute server-side operations when a software application encounters queuing delays from frequently switching between servers during high workload conditions. In another example, server responsiveness analysis program 300 may determine that app 140 generates a high-transactional workload (e.g., server-side operations).

Server responsiveness analysis program 300 may determine that a model indicates that the overall responsiveness of app 140 is improved by distributing the transaction operations among server 103, server 104, and server 105 and that computational operations may be routed to the server generating the lowest networking delay as opposed to the lowest execution delay. In another example, models may predict the optimal server(s) to select if a software application that previously had access to a plurality of servers is constrained to execute server-side operation on one or two servers. In addition, models generated by server responsiveness analysis program 300 may be utilized to analyze the metrics associated with one or more known software applications and servers to facilitate the selection of servers for a new application by pre-analysis program 200.

In step 316, server responsiveness analysis program 300 optionally updates the messaging server routing table. In one embodiment, server responsiveness analysis program 300 may update the messaging server routing table to indicate which server is selected for subsequent utilization for server-side operations based on the statistical analysis of the responsiveness data. For example, server-side operations of app 130 execute 10% faster on server 104 as opposed to server 105. In another embodiment, server responsiveness analysis program 300 may prioritize the selection of server instances in a messaging server routing table. In one scenario, server responsiveness analysis program 300 routes the server-side operations of multiple instances of a software application (e.g., app 150) to the first priority instance of a server identified within a messaging server routing table (e.g., identified in FIG. 2a, step 208). If the first instance of a server is not available, server responsiveness analysis program 300 routes the server-side operations of multiple instances of a software application (e.g., app 150) to the second priority instance of a server identified within a messaging server routing table. In another scenario, server responsiveness analysis program 300 modifies the routing distribution (e.g., distribution of servers selected) for the server-side operations of multiple instances of a software application. For example, initially, multiple instances of app 140 executing on client device 120 are distributed on a 1:1 basis. After statistical analysis, server responsiveness analysis program 300 distributes the multiple instances of app 140 executing on client device 120 between server 103 and server 104 on a 3:2 basis.

Referring to step 316, in a further embodiment, server responsiveness analysis program 300 may update the messaging server routing table based on quality-of-service parameters as opposed to speed-based parameters. Server responsiveness analysis program 300 utilizes the business logic of a software application or a transactional integrity requirement associated with the software application to update the messaging server routing table. For example, a financial or a medical software application may dictate that the primary selection criteria (e.g., application preference) for a server is the server with the highest transaction integrity.

Figure 4:
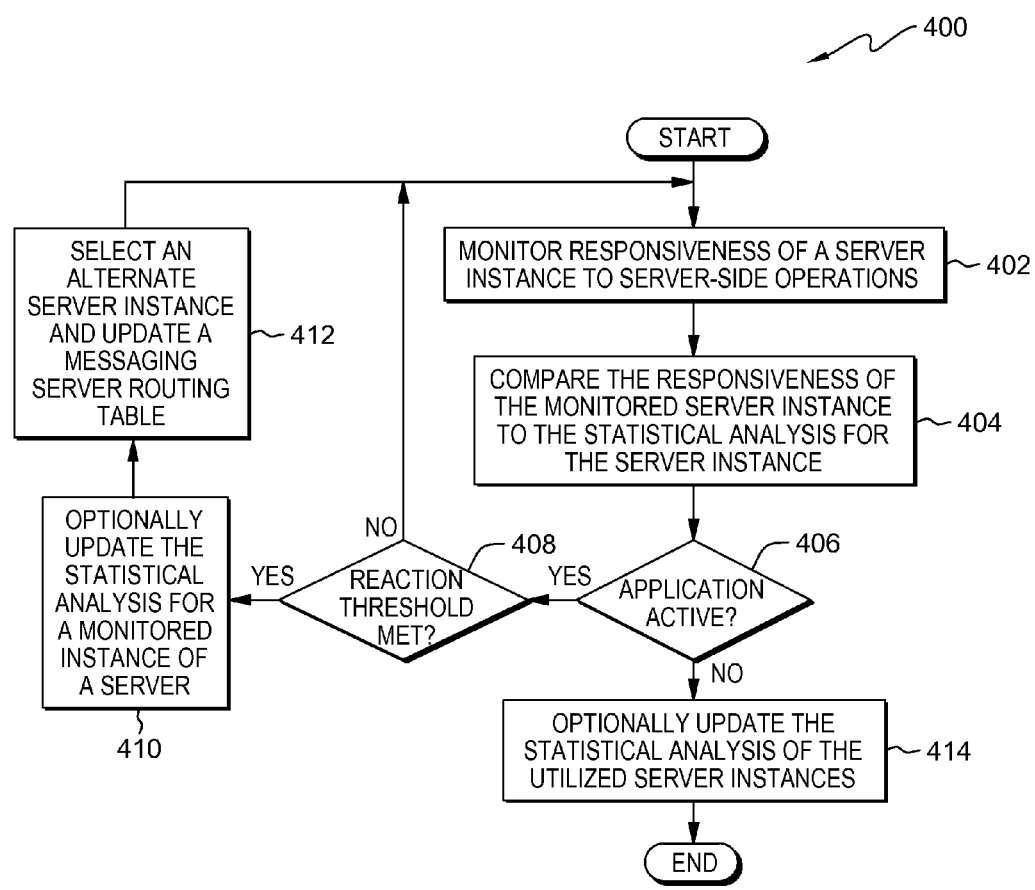
FIG. 4 depicts a flowchart of the operational steps of an application operation routing program, in accordance with an embodiment of the present invention.

FIG. 4 is a flowchart depicting operational steps for application operation routing program 400, a program for routing the server-side operations of a software application to server instances, monitoring the responsiveness of server instances to server-side operations, and selecting alternative server instances when reaction thresholds are met, in accordance with embodiments of the present invention.

In step 402, application operation routing program 400 monitors the responsiveness of a server instance to server-side operations. In one embodiment, application operation routing program 400 monitors various responsiveness parameters of a server instance from the transmission of a server-side operation by client device 120 via a messaging infrastructure to client device 120 receiving one or more results from the server via the messaging infrastructure within network 110. Application operation routing program 400 obtains data for responsiveness parameters such as: total response time, server-side operation execution time, rollback rates, transaction failure rates, etc. In another embodiment, application operation routing program 400 includes networking delays and transmission failures associated with a messaging infrastructure with the various responsiveness parameters associated with a server instance. In addition, application operation routing program 400 updates database 126 with the responsiveness data from the monitored server instance.

In step 404, application operation routing program 400 compares the responsiveness of the monitored server instance to the statistical analysis data for the server instance. In one embodiment, application operation routing program 400 determines which statistical parameters are utilized for the comparison based on application preferences. For example, transactional integrity is a primary consideration for app 150, so application operation routing program 400 compares the transaction integrity based on a number of server-side operations dictated by an application preference for app 150. In another embodiment, application operation routing program 400 may generate a comparison based on weighting factors applied to the monitored responsiveness data for server-side operations for an instance of a server. For example, app 140 may utilize weighting factors of 0.7 for messaging infrastructure delays and 0.3 for a transactional response time as the basis for comparison between the monitored responsiveness data and the statistical analysis data for server 103.

In decision step 406, application operation routing program 400 determines whether a software application remains active. Application operation routing program 400 may utilize methods and criteria for determining whether a software application remains active as previously discussed with regard to server responsiveness analysis program 300 (FIG. 3, decision step 310).

In decision step 406, in response to a determination that a software application remains active (yes branch, decision step 406), application operation routing program 400 determines whether the comparison at step 404 meets a reaction threshold (decision step 408).

In decision step 408, application operation routing program 400 determines whether a reaction threshold is met. In one embodiment, application operation routing program 400 determines whether a reaction threshold is met by utilizing one or more application preferences. In one scenario, application operation routing program 400 utilizes the application preferences associated with a server responsiveness parameter (e.g., total response time) and the monitored responsiveness data. For example, application operation routing program 400 determines that app 140 dictates that the application preferences for a server-side operation are the total response time responsiveness parameter, the historical mean of total response time, the standard deviation for the total response time parameter, and a ten-point moving average for the monitored total response time parameter. With respect to the total response time parameter of a server, if application operation routing program 400 determines that the ten-point moving average of the total response time responsiveness parameter is equal to or greater than the mean plus one standard deviation of the total response time, then the reaction threshold is met.

In another scenario, application operation routing program 400 may determine that an application preference indicates to utilize a statistical model to determine whether a reaction threshold is met. For example, application operation routing program 400 determines that there is more than one condition in the statistical model for a server. In one instance, if the current execution of app 130 occurs during a peak usage period (e.g., a holiday shopping period), then application operation routing program 400 utilizes a different calculation to determine whether a reaction threshold is met. In some scenarios, application operation routing program 400 utilizes a combination of weighting factors and responsiveness parameters to determine whether a reaction threshold is met. In other scenarios, application operation routing program 400 utilizes a combination of comparisons (e.g., responsiveness parameters) to determine whether a reaction threshold is met. For example, application operation routing program 400 may require that the standard deviation of the transaction response time of the monitored server-side operations (e.g., a 1-minute sample) exceeds 1.4× the historical standard deviation and the rollback rate is greater than 0.1%.

In another embodiment, application operation routing program 400 is reaction threshold may be relative to a number of transactions. In some scenarios, application operation routing program 400 may determine from user preferences, application preferences, and or operational preferences that server-side operations are distributed among servers. For example, an operational preference of client device 120 may specify that for every thirty server-side operations for app 140 that the distribution (e.g., 3:2:1) is fifteen server-side operations are processed by server (e.g., instance) 103, ten server-side operations are processed by server 104, and five server-side operations are processed by server 105. In one instance, if a server is unavailable, for example server 105, application operation routing program 400 proportionally redistributes the server-side operations (e.g., 23 operations for server 103, 12 operations for server 104). Alternatively, in another instance, application operation routing program 400 skips the unavailable server instance and reroutes the five remaining server-side operations to the primary server instance, server 103.

In decision step 408, in response to a determination that a reaction threshold is not met (no branch, decision step 408), application operation routing program 400 loops to step 402 to monitor the responsiveness of a server instance to the next server-side operation transferred to application operation routing program 400 by server responsiveness analysis program 300 (step 318).

In decision step 408, in response to a determination that a reaction threshold is met (yes branch, decision step 408), application operation routing program 400 optionally updates the statistical analysis for a monitored instance of a server (step 410).

In step 410, application operation routing program 400 optionally updates the statistical analysis for a monitored instance of a server. In some embodiments, application operation routing program 400 updates the statistical analysis for a monitored instance of a server prior to selecting an alternative server. For example, application operation routing program 400 may update the statistical analysis of a server instance to reduce the effects of "noisy" response data on subsequent server selections. In another example, application operation routing program 400 may update the statistical analysis for a monitored instance of a server to identify trends (e.g., workload shifts, peak usage periods) or occurrences (e.g., network maintenance) that affect server responsiveness. In other embodiments, application operation routing program 400 may be switching between server instances as part of distributing server-side operations between server instances. For example, application operation routing program 400 updates the statistical analysis for a monitored instance of a server to improve the statistical significance of the statistical analysis. In other embodiments, application operation routing program 400 may update the statistical analysis for a monitored instance of a server to determine which position to assign the current instance of the server in a hierarchically structured messaging server routing table.

In step 412, application operation routing program 400 selects an alternative server instance and updates a messaging server routing table. In one embodiment, application operation routing program 400 selects an alternative server instance based on the next server instance listed in a hierarchically structured messaging server routing table. In one scenario, application operation routing program 400 demotes the current instance of a server to the bottom of the list in the messaging server table. In another scenario, application operation routing program 400 positions, in a hierarchically structured messaging server routing table, the current instance of a monitored server based on statistical data associated with the current instance of a monitored server and the other instances of the server in the messaging server routing table. Subsequently, application operation routing program 400 loops to step 402 to monitor the responsiveness of the alternate server instance to the next server-side operation transferred to application operation routing program 400 by server responsiveness analysis program 300 (step 318).

In another embodiment, application operation routing program 400 selects a server instance for which statistical data is not available. In FIG. 3 (step 304), server responsiveness analysis program 300 routes the server-side operation to the alternate server instance. However, in decision step 306, server responsiveness analysis program 300 determines that statistical data is not available for the alternate server instance (no branch, decision step 306). Server responsiveness analysis program 300 determines server responsiveness as opposed to application operation routing program 400 until statistical analysis data is available for the alternate server instance.

Referring to decision step 406, in response to a determination that an application is not active (no branch, decision step 406), application operation routing program 400 optionally updates the statistical analysis of the utilized server instances (step 414).

In step 414, application operation routing program 400 optionally updates the statistical analysis of the utilized server instances. Application operation routing program 400 may track the plurality of instances of various servers throughout the execution of a software application. In one embodiment, application operation routing program 400 may update the statistical analysis of the utilized server instances on a periodic basis. In one scenario, application operation routing program 400 schedules the statistical analysis of the plurality of utilized server instances once every 24 hours. In another scenario, application operation routing program 400 utilizes activity as the basis for the periodic update of a statistical analysis. For example, application operation routing program 400 utilizes server instance time as the basis for a statistical analysis update. In another example, application operation routing program 400 utilizes a number of server-side operations processed as the basis for a statistical analysis update. In another embodiment, application operation routing program 400 utilizes one or more application preferences or operational preferences (e.g., client device 120). For example, application operation routing program 400 may utilize the number of executions of app 130. In another example, application operation routing program 400 utilizes the power-on hours of client device 120.

Figure 5:
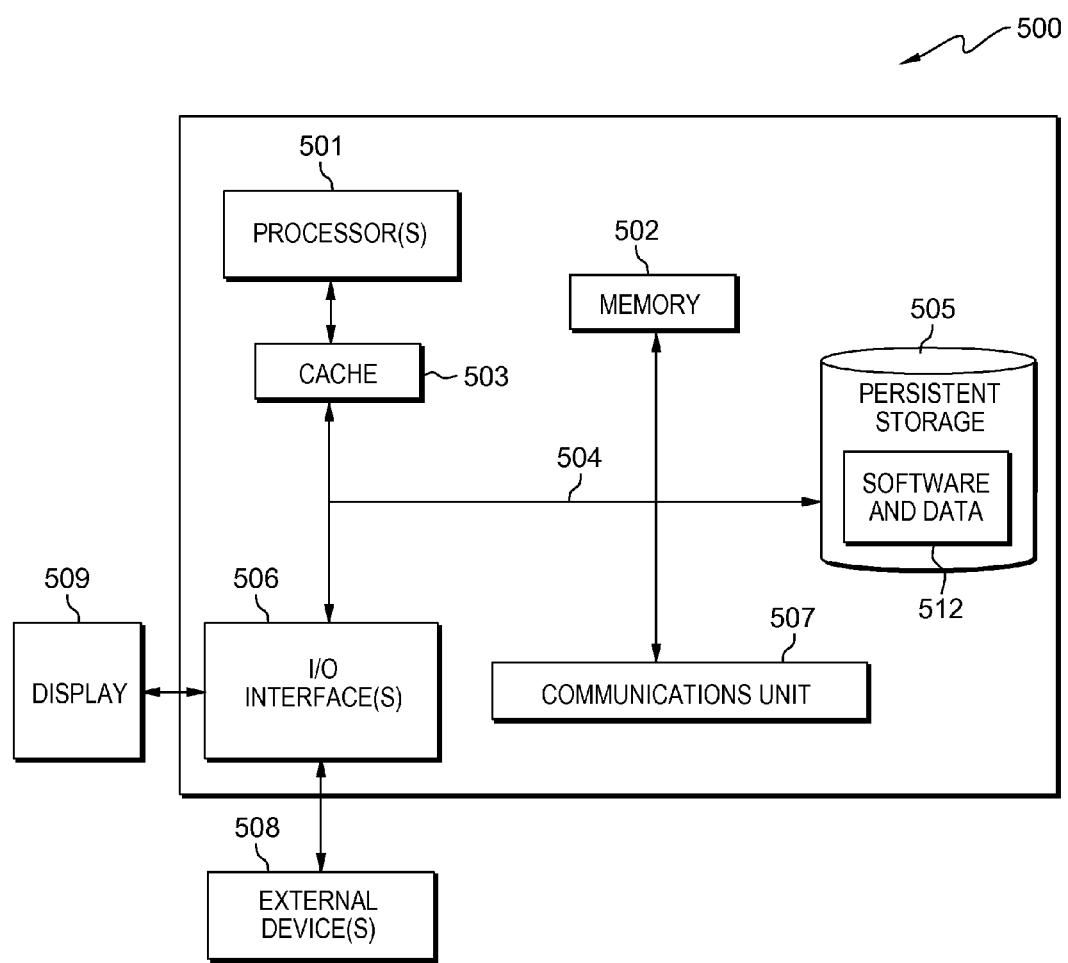
FIG. 5 is a block diagram of components of a computer, in accordance with an embodiment of the present invention.

FIG. 5 depicts computer system 500, which is representative of server 103 and client device 120. Computer system 500 is an example of a system that includes software and data 512. Computer system 500 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to server 103, server 104, and server 105, software and data 512 includes resources (not shown) utilized by client device 120. With respect to client device 120, software and data 512 includes user interface (UI) 122, file storage 124, database 126, app 130, app 140, app 150, pre-analysis program 200, server availability program 250, server responsiveness analysis program 300, application operation routing program 400, and various programs (not shown).

Communications unit 507, in these examples, provides for communications with other data processing systems or devices, including resources of server 103, client device 120. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing execution of software operations, the method comprising:
   determining, by one or more computer processors, that a software program executing on a client device utilizes a network to access one or more servers to execute one or more software operations, wherein the one or more software operations that execute on servers are associated with application programming interface (API) calls;
   identifying, by one or more computer processors, a first server from among a plurality of servers that are capable of executing a first software operation of the software program based, at least in part, on a historically-based responsiveness associated with the execution of the one or more software operations for the client device and a plurality of historically-based responsiveness respectively associated with the plurality of servers capable of executing the first software operations for the client device;
       wherein a historically-based responsiveness associated with executing a software operation for the client device is based on a total response duration for routing the software operation of the software application from the client device to an identified server, one or more results received at the client device from the identified server executing the software operation, and a duration related to one or more delays associated with the network utilized by the client to access the identified server;
   dictating, by one or more computer processors, routing of the first software operation of the software program to the identified first server, wherein the client device specifies to route a software operation to a server capable of executing the software operation by utilizing message-oriented middleware; and
   updating, by one or more computer processors, the historically-based responsiveness of the first server based, at least in part, on one or more responsiveness parameters attributed to the total response duration related to the dictated execution of the first software operation of the software program by the first server.

2. The method of claim 1, wherein identifying the first server from the plurality of servers further comprises:
   selecting, by one or more processors, the first server from the plurality of servers based, at least in part, on one or more members of the group consisting of one or more metrics describing each server, one or more metrics associated with the software program, one or more metrics associated with a sequence of operations of the software program, one or more threshold values for a responsiveness parameter, one or more statistically calculated values for the historically-based responsiveness associated with the total response duration, and information within a server routing table.

3. The method of claim 2, further comprising:
   determining, by one or more computer processors, a status respectively associated with servers capable of executing the first software operation;
   modifying, by one or more computer processors, the server routing table based on the status corresponding to a server; and
   identifying, by one or more computer processors, within the server routing table, the one or more servers that are available to execute the first software operation.

4. The method of claim 1, further comprising:
   identifying, by one or more processors, a plurality of servers that are capable of executing the one or more software operations of the software program based on one or more members of the group consisting of: business logic of the software program, a remote procedure call utilized by the software program, a domain name system, a connection factory, a server routing table, and a channel definition table.

5. The method of claim 1, wherein the plurality of servers exist in at least one of: an enterprise computing system, a grid computing system, a cloud computing system, and a virtualized computing environment.

6. The method of claim 1, wherein the historically-based responsiveness of the server is further based on one or more service-based parameters selected from the group consisting of a rate of rollback for the software operation, a rate of failure associated with obtaining one or more results from the server, and a rate of failure of transmissions associated with a network connection to the server.

7. A computer program product for managing execution of software operations, the computer program product comprising:
   one or more computer readable storage media and program instructions stored on the one or more computer readable storage media, the program instructions comprising:
   program instructions to determine that a software program executing on a client device utilizes a network to access one or more servers to execute one or more software operations, wherein the one or more software operations that execute on servers are associated with application programming interface (API) calls;
   program instructions to identify a first server from among a plurality of servers that are capable of executing a first software operation of the software program based, at least in part, on a historically-based responsiveness associated with the execution of the one or more software operations for the client device and a plurality of historically-based responsiveness respectively associated with the plurality of servers capable of executing the first software operations for the client device;
       wherein a historically-based responsiveness associated with executing a software operation for the client device is based on a total response duration for routing the software operation of the software application from the client device to an identified server, one or more results received at the client device from the identified server executing the software operation, and a duration related to one or more delays associated with the network utilized by the client to access the identified server;
   program instructions to dictate the at least one software operation of the software program on the identified first server, wherein the client device specifies to route a software operation to a server capable of executing the software operation by utilizing message-oriented middleware; and
   program instructions to update the historically-based responsiveness of the first server based, at least in part, on one or more responsiveness parameters attributed to the total response duration related to the dictated execution of the first software operation of the software program by the first server.

8. The computer program product of claim 7, wherein program instruction to identify the first server from the plurality of servers further comprises:
program instruction to select the first server from the plurality of servers based, at least in part, on one or more members of the group consisting of one or more metrics describing each server, one or more metrics associated with the software program, one or more metrics associated with a sequence of operations of the software program, one or more threshold values for a responsiveness parameter, one or more statistically calculated values for the historically-based responsiveness associated with the total response duration, and information within a server routing table.

9. The computer program product of claim 8, further comprising:
program instructions to determine a status respectively associated with servers capable of executing the first software operation;
program instructions to modify the server routing table based on the status corresponding to a server; and
program instructions to identify within the server routing table, the one or more servers that are available to execute the first software operation.

10. The computer program product of claim 7, further comprising:
program instructions to identify a plurality of servers that are capable of executing the one or more software operations of the software program based on one or more members of the group consisting of: business logic of the software program, a remote procedure call utilized by the software program, a domain name system, a connection factory, a server routing table, and a channel definition table.

11. The computer program product of claim 7, wherein the historically-based responsiveness of the server is further based on one or more service-based parameters selected from the group consisting of a rate of rollback for the software operation, a rate of failure associated with obtaining one or more results from the server, and a rate of failure of transmissions associated with a network connection to the server.

12. A computer system for managing execution of software operations, the computer system comprising:
one or more computer processors;
one or more computer readable storage media;
program instructions stored on the computer readable storage media for execution by at least one of the one or more computer processors, the program instructions comprising:
program instructions to determine that a software program executing on a client device utilizes a network to access one or more servers to execute one or more software operations, wherein the one or more software operations that execute on servers are associated with application programming interface (API) calls;
program instructions to identify a first server from among a plurality of servers that are capable of executing a first software operation of the software program based, at least in part, on a historically-based responsiveness associated with the execution of the one or more software operations for the client device and a plurality of historically-based responsiveness respectively associated with the plurality of servers capable of executing the first software operations for the client device;
wherein a historically-based responsiveness associated with executing a software operation for the client device is based on a total response duration for routing the software operation of the software application from the client device to an identified server, one or more results received at the client device from the identified server executing the software operation, and a duration related to one or more delays associated with the network utilized by the client to access the identified server;
program instructions to dictate the at least one software operation of the software program on the identified first server, wherein the client device specifies to route a software operation to a server capable of executing the software operation by utilizing message-oriented middleware; and
program instructions to update the historically-based responsiveness of the first server based, at least in part, on one or more responsiveness parameters attributed to the total response duration related to the dictated execution of the first software operation of the software program by the first server.

13. The computer system of claim 12, further comprising:
program instructions to identify a plurality of servers that are capable of executing the at least one software operation of the software program based on the at least one of: business logic of the software program, a remote procedure call utilized by the software program, a domain name system, a connection factory, a server routing table, and a channel definition table.

14. The computer system of claim 12, wherein program instruction to identify the first server from the plurality of servers further comprises:
program instruction to select the first server from the plurality of servers based, at least in part, on one or more members of the group consisting of one or more metrics describing each server, one or more metrics associated with the software program, one or more metrics associated with a sequence of operations of the software program, one or more threshold values for a responsiveness parameter, and one or more statistically calculated values for the historically-based responsiveness associated with the total response duration, and information within a server routing table.

15. The computer system of claim 14, further comprising:
program instructions to determine a status respectively associated with servers capable of executing the first software operation;
program instructions to modify the server routing table based on the status corresponding to a server; and
program instructions to identify within the server routing table, the one or more servers that are available to execute the first software operation.

16. The computer system of claim 12, wherein the historically-based responsiveness of the server is further based on one or more service-based parameters selected from the group consisting of a rate of rollback for the software operation, a rate of failure associated with obtaining one or more results from the server, and a rate of failure of transmissions associated with a network connection to the server.

* * * * *